(12) United States Patent
Huber-Lenk (10) Patent No.: US 11,885,607 B2
(45) Date of Patent: Jan. 30, 2024

(54) DEVICE FOR INTERFEROMETRIC DISTANCE MEASUREMENT

(71) Applicant: DR. JOHANNES HEIDENHAIN GmbH, Traunreut (DE)

(72) Inventor: Herbert Huber-Lenk, Nußdorf/Sondermoning (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 31 days.

(21) Appl. No.: 17/673,976

(22) Filed: Feb. 17, 2022

(65) Prior Publication Data
US 2022/0276040 A1    Sep. 1, 2022

(30) Foreign Application Priority Data

Feb. 24, 2021    (DE) .......................... 102021201722.3

(51) Int. Cl.
*G01B 9/02061*    (2022.01)
*G01B 11/02*    (2006.01)
*G01B 9/02055*    (2022.01)

(52) U.S. Cl.
CPC ........ *G01B 11/026* (2013.01); *G01B 9/02081* (2013.01); *G01B 9/02061* (2013.01); *G01B 2290/45* (2013.01); *G01B 2290/70* (2013.01)

(58) Field of Classification Search
CPC .. G01B 11/026; G01B 11/14; G01B 9/02081; G01B 9/02061; G01B 2290/45;
(Continued)

(56) References Cited

U.S. PATENT DOCUMENTS

| 6,496,266 B1 * | 12/2002 | Nishioki | G01B 9/02027 356/486 |
| 10,746,532 B2 | 8/2020 | Meissner et al. | |
| 2010/0225924 A1 * | 9/2010 | Kuramoto | G01B 9/02067 356/487 |

FOREIGN PATENT DOCUMENTS

DE    102017213258 A1    2/2019
WO    2018/171970 A1    9/2018

OTHER PUBLICATIONS

Falaggis, K. et al., "Absolute Metrology by Phase and Frequency Modulation for Multiwavelength Interferometry" Optics Letters (Aug. 2011) pp. 2928-2930, vol. 36, No. 15.
(Continued)

*Primary Examiner* — Jonathan M Hansen
(74) *Attorney, Agent, or Firm* — Carter, DeLuca & Farrell LLP (57) ABSTRACT

An interferometric distance-measurement device includes a multi-wavelength light source which provides a beam having at least three different wavelengths. An interferometer unit splits the beam into measuring and reference beams. The measuring beam propagates in the direction of a measuring reflector movable along a measuring axis and undergoes a back-reflection, and the reference beam propagates in the direction of a stationary reference reflector and undergoes a back-reflection. The back-reflected measuring and reference beams interfere with each other in an interference beam. A detection unit splits the interference beam such that several phase-shifted partial interference signals result for each wavelength. A signal processing unit determines absolute position information regarding the measuring reflector from the partial interference signals of different wavelengths and an additional coarse position signal.

15 Claims, 7 Drawing Sheets

(58) Field of Classification Search
CPC ............ G01B 2290/70; G01B 2290/60; G01B 9/0201; G01B 9/02007; G01B 9/02011
See application file for complete search history.

(56) References Cited

OTHER PUBLICATIONS

EP Search Report issued in corresponding EP Patent Application No. 22156019, dated Jul. 13, 2022, pp. 1-2.

* cited by examiner

DEVICE FOR INTERFEROMETRIC DISTANCE MEASUREMENT

CROSS-REFERENCE TO RELATED APPLICATIONS

The present application claims priority to Application No. 10 2021 201 722.3, filed in the Federal Republic of Germany on Feb. 24, 2021, which is expressly incorporated herein in its entirety by reference thereto.

FIELD OF THE INVENTION

The present invention relates to a device for interferometric distance measurement. In particular, the device is suitable for determining absolute distances between two objects that are movable in relation to one another.

BACKGROUND INFORMATION

German Patent Document No. 10 2017 213 258 and U.S. Pat. No. 10,746,532 describe a device for the interferometric determination of absolute distances between two mutually moving objects that is based on a so-called multi-wavelength method. One or more beat phases are determined from the difference between the interference phases of different wavelengths, which allows for unambiguous absolute position determination over a larger distance range. Corresponding devices can also be arranged in a cascaded manner and, starting from a plurality of different wavelengths, can provide for the generation of a plurality of beat phases.

The device described in German Patent Document No. 10 2017 213 258 and U.S. Pat. No. 10,746,532 has a multi-wavelength light source that supplies a beam with at least three different wavelengths. The multi-wavelength light source is arranged as a fiber laser including at least three different Bragg gratings whose grating constants are matched to the generated wavelengths. Furthermore, an interferometer unit is provided which splits the beam into a measuring beam and a reference beam. The measuring beam propagates inside a measuring arm in the direction of a measuring reflector and undergoes a back reflection therein; the reference beam propagates inside a reference arm in the direction of a stationary reference reflector and undergoes a back reflection therein. The measuring and reference beams reflected back by the measuring and reference reflectors are superimposed in an interference beam. A detection unit splits the interference beam such that a plurality of phase-shifted partial interference signals results for each wavelength. A signal processing unit is used to determine absolute position information regarding the measuring reflector from the partial interference signals of different wavelengths and an additional coarse position signal. To generate the coarse position signal, a propagation time measurement method is utilized in which the propagation time of light pulses to the measuring reflector and back is determined and the coarse position signal is derived from the propagation time. For such a propagation time measurement method, additional optical and electronic components for light generation, coupling and decoupling, detection, amplification, and time measurement are required for each measuring axis.

SUMMARY

Example embodiments of the present invention provide a device for absolute interferometric distance measurement, in which a coarse position signal is generated with as little additional effort as possible.

According to an example embodiment of the present invention, a device for interferometric distance measurement includes a multi-wavelength light source providing a beam of at least three different wavelengths. Furthermore, an interferometer unit is provided which splits the beam into a measuring beam and a reference beam. The measuring beam propagates inside a measuring arm in the direction of a measuring reflector and undergoes a back reflection therein; the reference beam propagates inside a reference arm in the direction of a stationary reference reflector and undergoes a back reflection therein. The measuring and reference beams reflected back by the measuring and reference reflectors are interferingly superimposed in an interference beam. Furthermore, at least one detection unit is provided for splitting the interference beam such that a plurality of phase-shifted partial interference signals results for each wavelength. At least one signal processing unit is adapted to determine absolute position information regarding the measuring reflector from the partial interference signals of different wavelengths and an additional coarse position signal. To generate the coarse position signal, a phase modulation is imposed on at least one emitted wavelength via a modulation unit, so that a phase-modulated beam propagates in the direction of the at least one interferometer unit and causes a distance-dependent modulation in at least one partial interference signal.

The modulation unit may include an electro-optical modulator and a sine wave generator, the sine wave generator driving the electro-optical modulator at a defined modulation frequency and a defined voltage amplitude.

The modulation frequency of the sine wave generator may be selected to be greater than occurring mechanical and acoustic frequencies.

For example, it is possible that the modulation frequency of the sine wave generator is in the frequency range of 100 kHz to 10 MHz, for example.

The electro-optical modulator may be arranged as an integrated, fiber-coupled modulator.

For example, a distance-dependent phase and amplitude modulation results in at least one partial interference signal.

The signal processing unit may be adapted to generate the coarse position signal.

The signal processing unit may be adapted to: determine a modulated phase value from at least one evaluated partial interference signal, determine a position phase amplitude from the modulated phase value, and determine the coarse position signal using the position phase amplitude and the light phase amplitude impressed into the phase-modulated beam.

The coarse position signal may be determined according to the relationship:

$$L_G = \frac{c}{2\pi * f_{PM}} * a \sin\left(\frac{A_{\lambda i}}{2 A_{\lambda i PM}}\right),$$

in which LG represents a coarse position signal, c represents the speed of light in the measuring medium, $f_{PM}$ represents a modulation frequency, $A_{\lambda i}$ represents a position phase amplitude, for i=1, 2, 3, and $A_{\lambda i PM}$ represents a light phase amplitude, for i=1, 2, 3.

A light phase amplitude determining unit may be adapted to determine the light phase amplitude impressed on the phase-modulated beam.

The signal processing unit may be adapted to determine an unmodulated phase value from the phase-shifted electrical partial interference signals per wavelength, form a plurality of differential phases from the unmodulated phase values, each of which is assigned to different synthetic wavelengths, and determine from the coarse position signal and the differential phases a high-resolution absolute position information regarding the measuring reflector.

It may be provided that a splitting element splits the phase-modulated beam into a plurality of phase-modulated partial beams, and, to assign different measuring axes to a plurality of interferometer units, to each of which a phase-modulated partial beam can be supplied, each interferometer unit is followed by a detection unit and a signal processing unit in order to determine for each measuring axis absolute position information with regard to the respective measuring reflector.

A phase-modulated partial beam may be supplied to a light phase amplitude determining unit, which supplies the light phase amplitude determined thereby to the signal processing units in the individual measuring axes for further processing.

The interferometer unit may include a beam splitting unit, the measuring reflector that is movable along at least one measuring direction, the stationary reference reflector, and a beam recombining unit, in which the splitting of the phase-modulated beam into a measuring and a reference beam takes place via the beam splitting unit, and the superimposition of the measuring and reference beams reflected back by the measuring and reference reflectors to form the interference beam takes place via the beam recombining unit.

The effort required to generate a coarse position signal may be considerably reduced according to the arrangements described herein. For example, no additional optical components are required for coupling and decoupling the light pulses, and no additional electronic components are required for light generation, detection, amplification, and time measurement.

Moreover, since the coarse position signal is generated using the identical components as the high-resolution interferometer signals, temporal consistency of the various position information is ensured without additional measures.

Furthermore, the modulated multi-wavelength light source may be used to supply a plurality of measuring axes if required, whereas in the case of coarse position signal generation via a propagation time measurement, separate optical and electronic components are required for each measuring axis.

Further features and aspects of example embodiments of the present invention are described in more detail below with reference to the appended schematic Figures.

DETAILED DESCRIPTION

Figure 1:
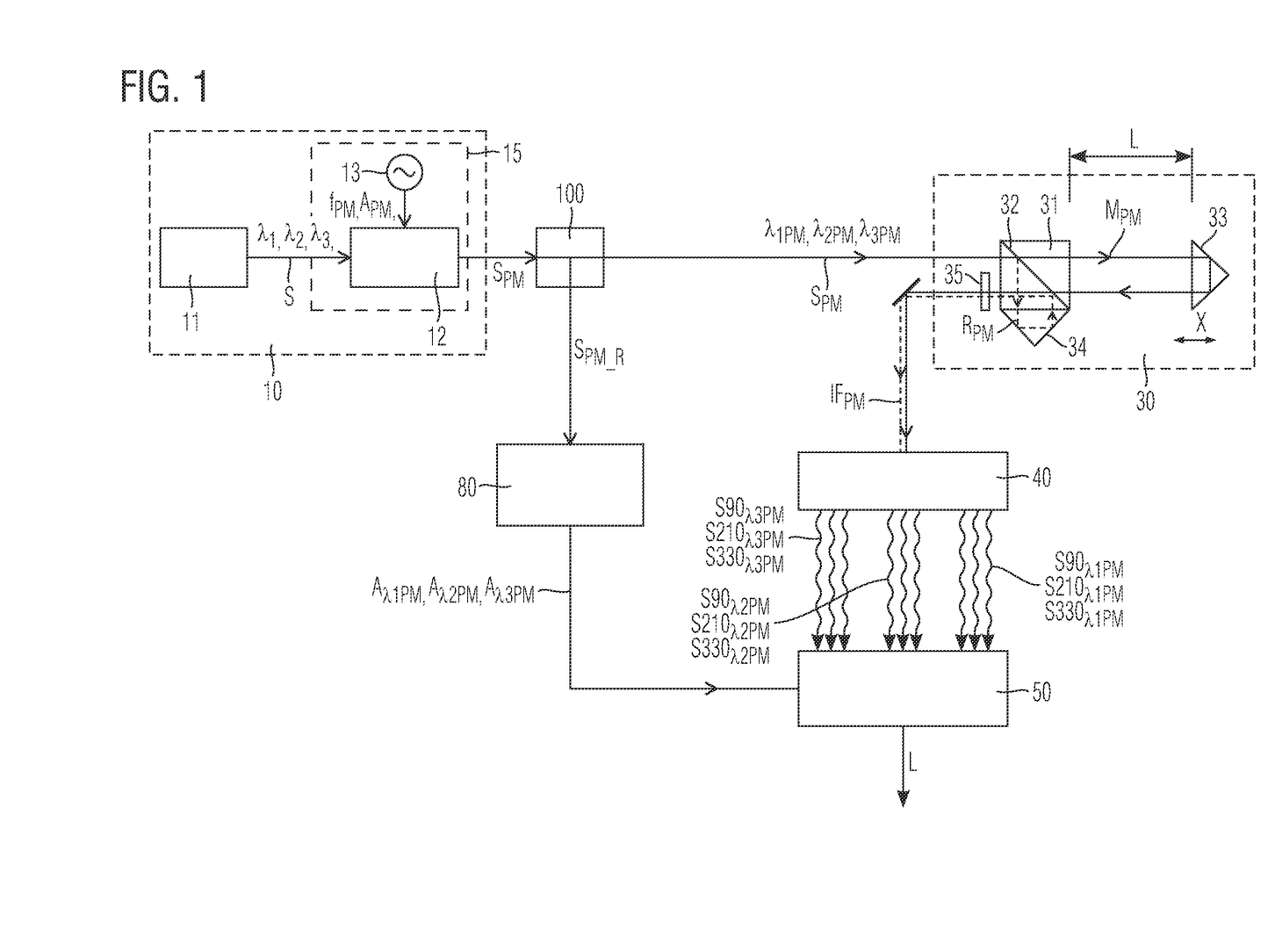
FIG. 1 schematically illustrates a device according to an example embodiment of the present invention.

A device for interferometric distance measurement according to an example embodiment of the present invention is schematically illustrated in FIG. 1. The device includes a light source unit 10, an interferometer unit 30, a detection unit 40, a signal processing unit 50, and a light phase amplitude determining unit 80. The device makes it possible to determine with high precision an absolute position information L or an absolute distance between two objects that are movable relative to one another. For example, one of the two objects is connected to the measuring reflector 33 belonging to the interferometer unit 30 and movable along the measuring direction x, and the other of the two objects is connected to the other components of the interferometer unit 30, which are arranged stationary with respect thereto.

The two objects may, for example, be machine parts that are movable relative to one another and whose absolute distance can be determined by the device described herein. The information generated by the device with respect to the absolute position information L may be further processed by a higher-level machine control system.

It is also possible to use the device in laser trackers or laser tracers. The absolute distance between the stationary components of the interferometer unit 30 and the measuring reflector 33 movable in space is determined. Such systems may be used in connection with a wide variety of measurement and/or calibration tasks. In addition, there are other possible applications for the device described herein.

Before the procedure for determining a coarse position signal LG and for determining the absolute position information L is described in detail, the overall system and the function of the most important components thereof are first described with reference to the Figures.

The light source unit 10 of the device includes comprises a multi-wavelength light source 11, which emits a beam S with at least three different wavelengths $\lambda_i$ (i=1, 2, 3), each of which has a small spectral line-width. The multi-wavelength light source 11 is a fiber laser including at least three different Bragg gratings whose grating constants are matched to the generated wavelengths $\lambda_i$ (i=1, 2, 3). German Patent Document No. 10 2017 213 258 and U.S. Pat. No. 10,746,532 provide further details of the multi-wavelength light source 11 and the selection of suitable wavelengths $\lambda_i$ (i=1, 2, 3) and are expressly incorporated herein in their entireties by reference thereto.

The beam S supplied by the multi-wavelength light source 11 undergoes phase modulation via a modulation unit 15, with phase modulation being impressed on at least one emitted wavelength $\lambda_i$ (i=1, 2, 3). In the illustrated example embodiment, it is furthermore intended to impress such phase modulation on all three emitted wavelengths $\lambda_1, \lambda_2, \lambda_3$. For this purpose, the modulation unit 15 includes a sine wave generator 13, which drives an electro-optical modulator 12 at a defined modulation frequency $f_{PM}$ and a defined voltage amplitude $A_{PM}$. The electro-optical modulator 12 may be arranged as an integrated, fiber-coupled modulator.

The modulation frequency $f_{PM}$ of the sine wave generator 13 may be selected to be in the frequency range of, for example, 100 kHz to 10 MHz. It is further taken into account that, in order to avoid measurement errors, the modulation frequency $f_{PM}$ is greater than mechanical frequencies (a few kHz) and acoustic frequencies (a few hundred kHz) occurring in the system. For example, a modulation frequency $f_{PM}$ of 1.5625 MHz may be provided.

A phase-modulated beam $S_{PM}$ is thus emitted from the light source unit 10, with the various wavelengths $\lambda_i$ (i=1, 2, 3) having the impressed light phase amplitudes $A_{\lambda iPM}$ (i=1, 2, 3). The light phase amplitudes $A_{\lambda iPM}$ (i=1, 2, 3) are in the range of a plurality of multiples of $\pi$ (=180°). Described in more detail below is how the impressed phase modulation is used, for example, for generating a coarse position signal $L_G$.

Via a beam diverter 100 arranged downstream of the light source unit 10 in the form of a fiber optic splitter, a portion $S_{PM\_R}$ of the phase-modulated beam $S_{PM}$ is split off and supplied to the light phase amplitude determining unit 80, with which the light phase amplitudes $A_{\lambda iPM}$ (i=1, 2, 3) impressed by the modulation unit 15 are determined and made available to the signal processing unit 50, which requires them to generate the coarse position signal $L_G$. Regarding details on the determination and processing of these quantities, reference is also made to the following description.

The non-split part of the phase-modulated beam $S_{PM}$ with the phase-modulated wavelengths $\lambda_{iPm}$ (i=1, 2, 3) enters the interferometer unit 30, where it is split into a measuring beam $M_{PM}$ and a reference beam $R_{PM}$ by the beam splitting unit 31, which is arranged as a polarizing beam splitter. The measuring beam $M_{PM}$ propagates after splitting inside a measuring arm in the direction of a measuring reflector 33 that can be moved at least along the measuring direction x and is reflected back in the direction of incidence. The reference beam $R_{PM}$ propagates after splitting inside a reference arm in the direction of a stationary reference reflector 34 and is also reflected back in the direction of incidence. In the illustrated example, the measuring reflector 33 and the reference reflector 34 are arranged as retro-reflecting triple mirrors. The measuring and reference beams $M_{PM}$, $R_{PM}$ reflected back by the measuring and reference reflectors 33, 34 enter the beam recombining unit 31, which is arranged as a polarizing beam splitter, and interfere to form an interference beam $IF_{PM}$. In the example embodiment illustrated in FIG. 1, a single component in the form of a beam splitter cube is provided as the beam splitting unit 31 or beam recombining unit 31, in which both units are formed together. At the beam splitter or beam combiner surface 32 of the beam splitter cube, the splitting of the phase-modulated beam $S_{PM}$ into measuring and reference beams $M_{PM}$, $R_{PM}$ or the recombination of the measuring and reference beams $M_{PM}$, $R_{PM}$ into the interference beam $IF_{PM}$ takes place. The index PM used in this context is intended to make clear that in addition to the incremental phase difference between the reference beam $R_{PM}$ and the measuring beam $M_{PM}$, which is dependent on the distance or the absolute position information L, there is also a distance-dependent modulation of the phase difference. Described in more detail below is how the coarse position signal $L_G$ is determined. The interference beam $IF_{PM}$ also passes through a $\lambda/4$ plate 35 at the output of the interferometer unit 30, which superimposes $\lambda/4$ the s- and p-polarized components of the interference beam $IF_{PM}$ to form a rotating E-field vector whose rotation angle is used for evaluation. In the present example embodiment, the interferometer unit 30 is arranged as a polarization-coded interferometer.

With regard to the interferometer unit 30, it should be noted that the arrangement in the form of a Michelson interferometer is merely exemplary and that alternative interferometer configurations and/or components may be used in the interferometer unit 30. For example, it is possible to use spheres with a refractive index n=2 as reflectors between which the absolute distance is measured. It is also possible to use measuring and reference reflectors of a different arrangement, for example, plane mirrors, etc. Likewise, a Mach-Zehnder interferometer with separate beam splitting and beam recombining units may be used to split and recombine the measuring and reference beams, etc.

The interference beam $IF_{PM}$ generated by the interferometer unit 30 propagates in the direction of the detection unit 40. Via this unit, the interference beam $IF_{PM}$ is split or processed such that, in each case a plurality of electrical, phase-shifted partial interference signals $S90_{\lambda iPM}$, $S210_{\lambda iPM}$, $S330_{\lambda iPM}$ (i=1, 2, 3) result on the output side per phase-modulated wavelength $\lambda_{iPM}$ (i=1, 2, 3), namely three 120° phase-shifted partial interference signals $S90_{\lambda iPM}$, $S210_{\lambda iPM}$, $S330_{\lambda iPM}$ (i=1, 2, 3) each per phase-modulated wavelength $\lambda_{iPM}$ (i=1, 2, 3). In the present example with three phase-modulated wavelengths $\lambda_{iPM}$ (i=1, 2, 3), a total of nine partial interference signals $S90_{\lambda iPM}$, $S210_{\lambda iPM}$, $S330_{\lambda iPM}$ (i=1, 2, 3) are present at the output of the detection unit 40, the signals subsequently being processed further for position measurement. With regard to a possible structure of the detection unit 40, reference is made to the following description of FIG. 2.

Figure 2:
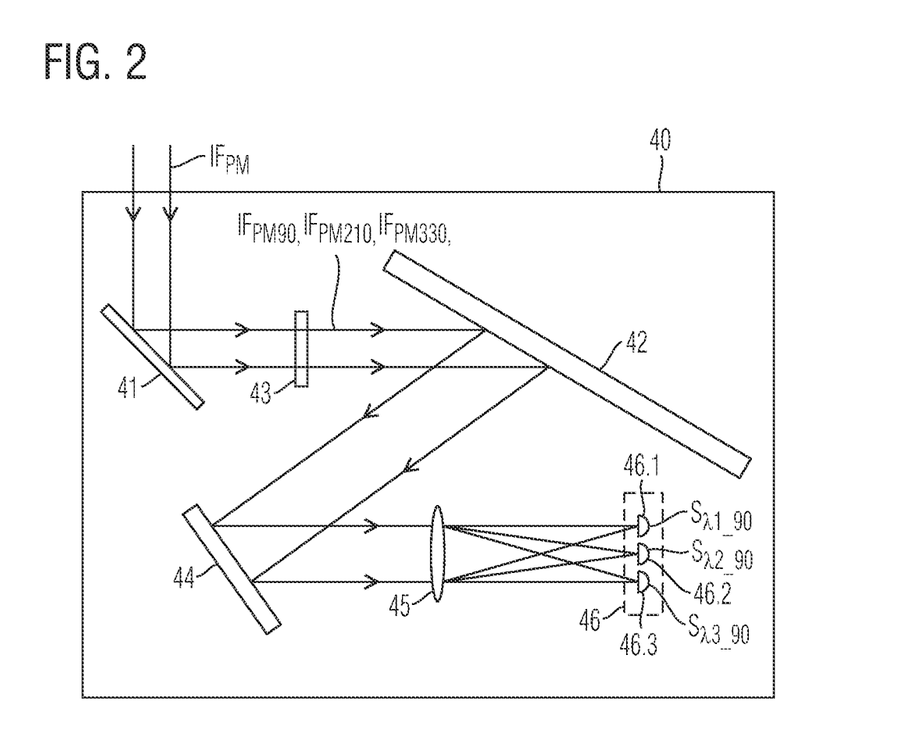
FIG. 2 schematically illustrates a detection unit of the device illustrated in FIG. 1.

As illustrated in FIG. 2, the interference beam $IF_{PM}$ generated by the interferometer unit, which after passing through the $\lambda/4$ plate 35 consists of a rotating, linearly polarized E field, impinges on the detection unit 40. There, a first splitting element 41 and a downstream polarization element 43 split the interference beam $IF_{PM}$ into three phase-shifted interference beams $IF_{PM90}$, $IF_{PM210}$, $IF_{PM330}$. The first splitting element 41 is arranged as a reflection phase grating, which first splits the interference beam $IF_{PM}$ incident thereon into three spatially separate interference beams. The polarization element 43 includes three linear polarization filters with polarization directions rotated by 60° relative to one another, causing the three interference beams separated by the splitting element 41 to be converted into three partial interference beams $IF_{PM90}$, $IF_{PM210}$, $IF_{PM330}$, each phase-shifted by 120°. The splitting into the three phase-shifted partial interference beams $IF_{PM90}$, $IF_{PM210}$, $IF_{PM330}$ via the first splitting element 41 and the polarization element 43 takes place perpendicular to the drawing plane, i.e., in the representation illustrated in FIG. 2, the three split phase-shifted partial interference beams $IF_{PM90}$, $IF_{PM210}$, $IF_{PM330}$ downstream of the polarization element 43 are not individually recognizable. The three phase-shifted partial interference beams $IF_{PM90}$, $IF_{PM210}$, $IF_{PM330}$ impinge on a second splitting element 42, which is also in the form of a reflection phase grating. The second splitting element 42 results in a wavelength-dependent splitting of the three phase-shifted partial interference beams $IF_{PM90}$, $IF_{PM210}$, $IF_{PM330}$, so that there are three phase-shifted partial interference beams per wavelength $\lambda_{iPM}$ (i=1, 2, 3), i.e., a total of nine partial interference beams. The partial interference beams reach a detector array 46 via a deflection element 44 and an imaging optics 45, which includes nine electro-optical detector elements 46.1 to 46.3 (see, FIG. 2). The imaging optics 45 is formed as a single lens or as a lens array and may also be formed in combination with the deflection element 44 in a single component. By the detector array 46 or its detector elements 46.1 to 46.9, the nine partial interference beams are detected and converted into nine electrical partial interference signals $S90_{\lambda iPM}$, $S210_{\lambda iPM}$, $S330_{\lambda iPM}$ (i=1, 2, 3), which are further processed in the signal processing unit. FIG. 2 shows only the three partial interference signals $S_{\lambda1\_90}, S_{\lambda2\_90}, S_{\lambda3\_90}$ of the total of nine generated partial interference signals $S90_{\lambda iPM}, S210_{\lambda iPM}, S330_{\lambda iPM}$ (i=1, 2, 3).

Further processing of the partial interference signals $S90_{\lambda iPM}, S210_{\lambda iPM}, S330_{\lambda iPM}$ (i=1, 2, 3) takes place in the signal processing unit 50, illustrated schematically in FIG. 1, which is adapted to generate a coarse position signal $L_G$ with respect to the movable measuring reflector 33 from the partial interference signals $S90_{\lambda iPM}, S210_{\lambda iPM}, S330_{\lambda iPM}$ (i=1, 2, 3) of different phase-modulated wavelengths $\lambda_{iPM}$ (i=1, 2, 3) and to determine the absolute position information L, step by step, via a multi-wavelength beat method.

The process for determining the coarse position signal $L_G$ is described in more detail below. An important aspect is the phase modulation impressed on the beam S, which leads to a distance-dependent modulation of the phase and the amplitude in the evaluated position signal of the interferometer unit 30. This means that both the amplitude of the modulation and its phase are distance-dependent with respect to the drive signal of the electro-optical modulator 12. The determination of the coarse position signal $L_G$ may substantially be performed with the existing hardware components of the interferometer unit 30, the detection unit 40, and the signal processing unit 50. Furthermore, in the exemplary embodiment illustrated in FIG. 1, only the light phase amplitude determining unit 80 is provided, which serves to determine the light phase amplitudes $A_{\lambda iPM}$ (=1, 2, 3) impressed by the modulation unit 15 at the various wavelengths $\lambda_i$ (i=1, 2, 3), which are used to determine the coarse position signal $L_G$.

The time-dependent modulated phase component $P_{\lambda iR}(t)$ of one of the wavelengths $\lambda_i$ (i=1, 2, 3) inside the reference beam $R_{PM}$, generated by the modulation unit 15, is assumed to satisfy the relationship:

$$P_{\lambda iR}(t) = A_{\lambda iPM} * \sin(2*\pi*f_{PM}*t).$$

In the following description, $A_{\lambda iPM}$ (i=1, 2, 3) denotes the light phase amplitude impressed by the modulation unit 15, and $f_m$ indicates the modulation frequency of the electro-optical modulator 12.

Since the time-dependent, modulated phase component $P_{\lambda iM}(t)$ in the measuring beam $M_{PM}$ is delayed with respect to the phase angle in the reference beam $R_{PM}$ by the propagation time of the light required for the traversed length 2×L inside the measuring arm, the following relationship is satisfied:

$$P_{\lambda iM}(t) = A_{\lambda iPM} * \sin\left(2*\pi*f_{PM}*\left(t - \frac{2L}{c}\right)\right).$$

In the foregoing relationship, c represents the speed of light in the measuring medium, and L indicates the absolute position information regarding the measuring reflector 33 or the absolute distance between the measuring reflector 33 and the beam splitting unit 31 illustrated in FIG. 1.

The time-dependent, modulated phase difference $\Delta P_{\lambda i}(t)$ between the reference and the measuring beam $R_{PM}, M_{PM}$ satisfies the relationship:

$$\Delta P_{\lambda i}(t) = A_{\lambda iPM} * \sin\left(2*\pi*f_{PM}\left(t - \frac{2L}{c}\right)\right) - A_{\lambda iPM} * \sin(2*\pi*f_{PM}*t).$$

By the following trigonometric relationships:

$$a*\sin(x+\alpha)+b*\sin(x+\beta)=$$
$$\sqrt{a^2+b^2+2ab*\cos(\alpha-\beta)}*\sin(x+\delta), \delta = a\tan 2(a*\cos(a)+b*\cos(\beta), a*\sin(a)+b*\sin(\beta)).$$

and replacing the parameters a, b, α, β, and x according to:

$$a = A_{\lambda iPM};$$

$$b = -A_{\lambda iPM};$$

$$\alpha = 2*\pi*f_{PM}*\left(-\frac{2L}{c}\right);$$

$$\beta = 0; \text{ and } x = 2*\pi*f_{PM}*t,$$

the position phase amplitude $A_{\lambda i}$ is calculated as a function of the absolute position information L according to the relationship:

$$A_{\lambda i} = \sqrt{a^2 + b^2 + 2ab*\cos(\alpha - \beta)} =$$
$$\sqrt{2A_{\lambda iPM}^2 - 2A_{\lambda iPM}^2 * \cos\left(2*\pi*f_{PM}*\left(-\frac{2L}{c}\right)\right)}.$$

The foregoing equation can be simplified to:

$$A_{\lambda i} = \sqrt{2} A_{\lambda iPM} * \sqrt{1 - \cos\left(2\pi*f_{PM}*\frac{2L}{c}\right)}.$$

Finally, by applying the relationship:

$$\left|\sin\frac{x}{2}\right| = \sqrt{\frac{1-\cos x}{2}},$$

the position phase amplitude $A_{\lambda i}$ is calculated according to:

$$A_{\lambda i} = 2A_{\lambda iPM} * \left|\sin\left(2\pi*f_{PM}*\frac{L}{c}\right)\right|.$$

The phase angle $\delta_{\lambda i}$ (i=1, 2, 3) of the time-dependent phase difference with respect to the drive signal of the electro-optical modulator 12 is thus calculated according to the relationship:

$$\delta_{\lambda i} = a\tan 2(a*\cos(a) + b*\cos(\beta),$$
$$a*\sin(a) + b*\sin(\beta)) = a\tan 2\Big(A_{\lambda iPM} *$$
$$\cos\left(2*\pi*f_{PM}*\left(-\frac{2L}{c}\right)\right) - A_{\lambda iPM}, A_{\lambda iPM} * \sin\left(2*\pi*f_{PM}*\left(-\frac{2L}{c}\right)\right)\Big).$$

The foregoing relationship can be further simplified to:

$$\delta_{\lambda i} = a\tan 2\left(\cos\left(2*\pi*f_{PM}\left(-\frac{2L}{c}\right)\right) - 1, \sin\left(2*\pi*f_{PM}\left(-\frac{2L}{c}\right)\right)\right).$$

Further transformation results in:

$$\delta_{\lambda i} = -2\pi*f_{PM}*\frac{L}{c} - \frac{\pi}{2}.$$

Thus, in addition to the incremental, distance-dependent phase difference between the measuring beam $M_{PM}$ and the reference beam $R_{PM}$, a sinusoidal, time- and length-dependent phase difference $\Delta P_{80\,i}(t)$ results in the interferometer; i=1, 2, 3 according to the relationship:

$$\Delta P_{\lambda i}(t) = A_{\lambda i} * \sin(2*\pi*f_{PM}*t + \delta_{\lambda i}).$$

In the detection unit 40, as described above, the individual wavelengths $\lambda_i$ (i=1, 2, 3) are separated and three electrical partial interference signals $S90_{\lambda iPM}$, $S210_{\lambda iPM}$, $S330_{\lambda iPM}$ (i=1, 2, 3) phase-shifted by 120° are generated for each wavelength $\lambda_i$ (i=1, 2, 3). These signals are provided to the signal processing unit 50.

Figure 3:
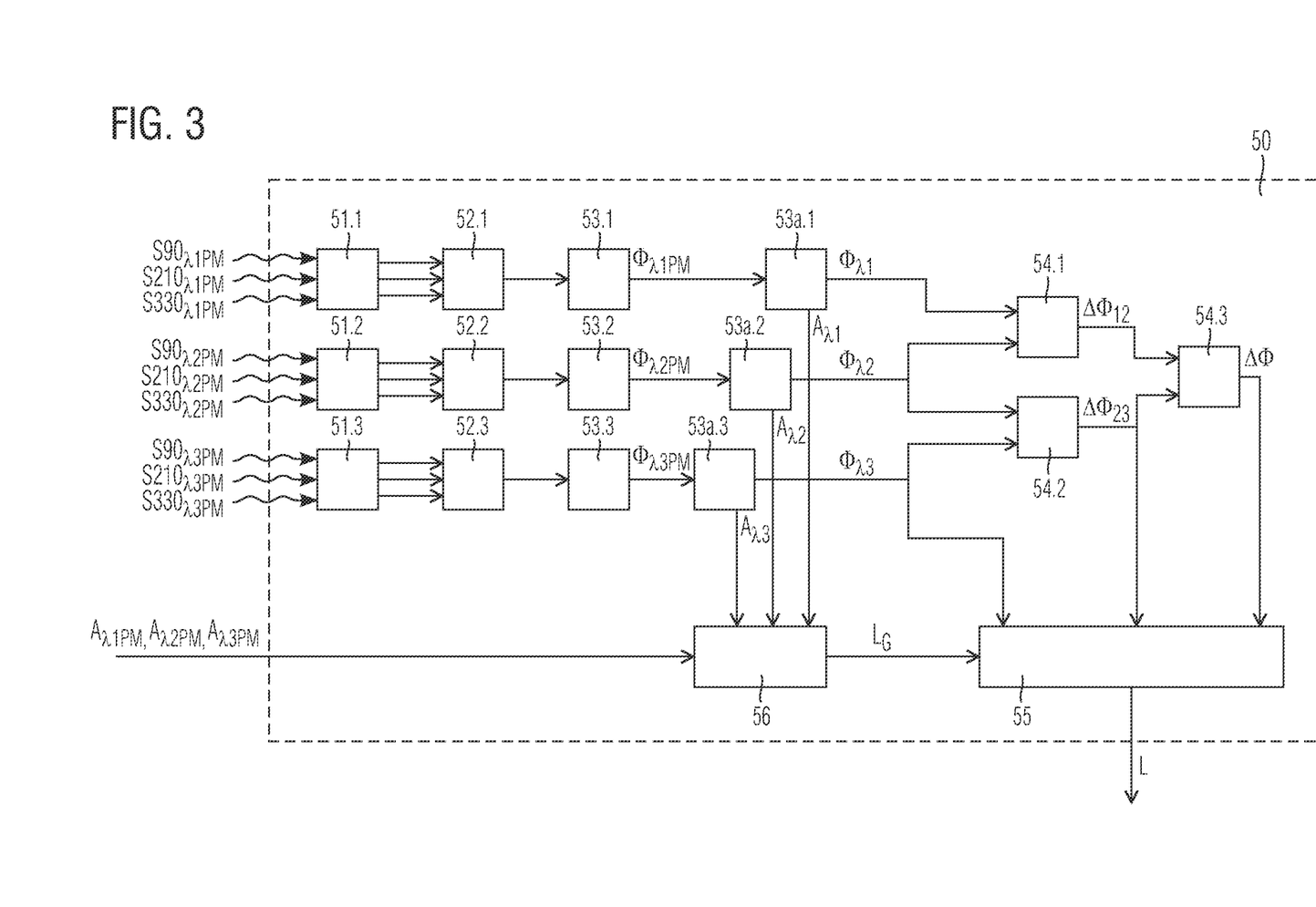
FIG. 3 schematically illustrates a signal processing unit of the device illustrated in FIG. 1.

In the signal processing unit 50, the partial interference signals $S90_{\lambda iPM}$, $S210_{\lambda iPM}$, $S330_{\lambda iPM}$ (i=1, 2, 3) are first amplified by amplifiers 51.1 to 51.3 and digitized by A/D converters 52.1 to 52.3. For each phase-modulated wavelength $\lambda_{iPM}$ (i=1, 2, 3), a modulated phase value $\Phi_{\lambda iPM}$ (i=1, 2, 3) is calculated via the phase calculation units 53.1 to 53.3. Due to the phase modulation of the light, the phase values $\Phi_{\lambda iPM}$ (i=1, 2, 3) each have a component modulated using the modulation frequency $f_{PM}$ and the position phase amplitudes $A_{\lambda i}$ (i=1, 2, 3) or a sinusoidal, time- and length-dependent phase difference $\Delta P_{\lambda i}(t)$; i=1, 2, 3 $\delta P_{\lambda i}(t)$. In the demodulation units 53a.1 to 53a.3, the position phase amplitudes $A_{\lambda i}$ (i=1, 2, 3) are determined and the unmodulated phase values $\Phi_{\lambda i}$ (i=1, 2, 3) are generated. An absolute coarse position signal $L_G$ is determined from the position phase amplitudes $A_{\lambda i}$ (i=1, 2, 3) in the coarse position determining unit 56 and is fed to the position determining unit 55.

The further determination of the absolute position information L from the unmodulated phase values $\Phi_{\lambda i}$ (i=1, 2, 3) and the coarse position signal $L_G$ is performed according to the process described in German Patent Document No. 10 2017 213 258 and U.S. Pat. No. 10,746,532, each of which is expressly incorporated herein in its entirety by reference thereto. For this purpose, the differential phases $\Delta\Phi_{12}$, $\Delta\Phi_{23}$, and $\Delta\Phi$ belonging to different synthetic wavelengths are determined from the unmodulated phase values $\Phi_{\lambda i}$ (i=1, 2, 3) by the differential phase calculating units 54.1 to 54.3 and transferred to the position determination unit 55.

The absolute position information L is determined in the position determination unit 55 in cascaded form on the basis of the supplied signals LG and $\Delta\Phi$, $\Delta\Phi_{23}$ and $\Phi_{\lambda 3}$. German Patent Document No. 10 2017 213 258 and U.S. Pat. No. 10,746,532, each of which is expressly incorporated herein in its entirety by reference thereto, further describes this process.

Described in more detail below is how the position phase amplitudes $A_{\lambda i}$ (i=1, 2, 3) are determined from the modulated phase values $\Phi_{\lambda iPM}$=1, 2, 3) in the demodulation units 53a.1 to 53.a3 used to determine the coarse position signal $L_G$, and are transferred for this purpose to the coarse position determining unit 56.

Figure 4:
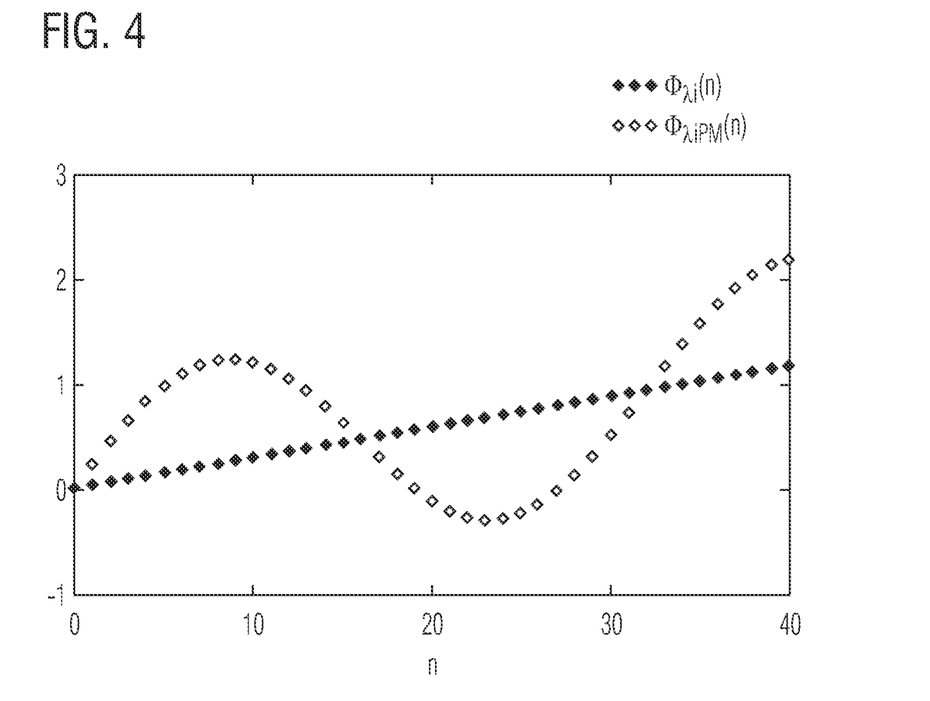
FIG. 4 illustrates a sampled phase values in the case where a measuring reflector of the device illustrated in FIG. 1 is moved at constant speed.

Each phase calculating unit 53.1 to 53.3 in the signal processing unit 50 supplies a modulated phase value $\Phi_{\lambda iPM}$ (n) (i=1, 2, 3) for each sampling time n. FIG. 4 illustrates an example of the sampled modulated phase values $\Phi_{\lambda iPM}(n)$ (i=1, 2, 3) and the unmodulated phase values $\Phi_{\lambda i}(n)$ (i=1, 2, 3) at the sampling times n when the measuring reflector 33 is moving at a constant speed. The sampling frequency $f_A$ is chosen in this example according to the relationship $f_A = 32 \cdot f_{PM}$.

The following relationship applies in general:

$$f_A = k*8*f_{PM},$$

in which:

$k \in \mathbb{N}$.

Figure 5:
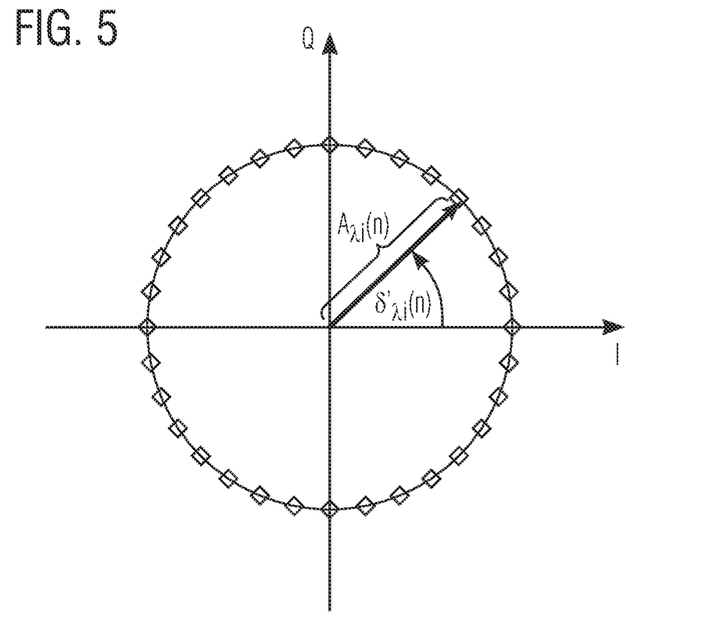
FIG. 5 illustrates the complex amplitudes of the resulting phase and amplitude modulation according to the device illustrated in FIG. 1.

In accordance with the relationships:

$$I_{\lambda i}(N) = \Phi_{\lambda iPM}(nk) - \frac{\Phi_{\lambda iPM}(n-3k) + \Phi_{\lambda iPM}(n+k)}{2},$$

$$Q_{\lambda i}(N) = \Phi_{\lambda iPM}(n+k) - (\Phi_{\lambda iPM}(n-k) + \Phi_{\lambda iPM}(n+3k))/2,$$

the in-phase values $I_{\lambda i}(n)$ (i=1, 2, 3) and the quadrature values $Q_{\lambda i}(n)$ (i=1, 2, 3) can be calculated for the complex amplitudes at each sampling time n. The in-phase values $I_{\lambda i}(n)$ (i=1, 2, 3) denote the real part of the complex amplitudes and the quadrature values $Q_{\lambda i}(n)$ (i=1, 2, 3) denote the imaginary part of the complex amplitudes. FIG. 5 illustrates an example with 32 sample values in the complex number plane, i.e., in the so-called IQ plane. The magnitude of the position phase amplitude $A_{\lambda i}(n)$ (i=1, 2, 3) at the sampling time n is thus:

$$A_{\lambda i}(n) = \sqrt{I_{\lambda i}(n)^2 + Q_{\lambda i}(n)^2}.$$

Likewise, the phase angle $\delta_{\lambda i}(n)$ (i=1, 2, 3) of the modulation with respect to the drive signal of the electro-optical modulator 12 at the sampling time n can be calculated from the relationships:

$$\hat{\delta}_{\lambda i}(n) = a\tan 2(I_{\lambda i}(n), Q_{\lambda i}(n)),$$

$$\delta_{\lambda i}(n) = \hat{\delta}_{\lambda i}(n) - \frac{2\pi}{8k} * (n \bmod 8k).$$

In the foregoing relationships, $\hat{\delta}_{\lambda i}(n)$ (i=1, 2, 3) represents the angle of the complex pointer from $I_{\lambda i}(n)$ and $Q_{\lambda i}(n)$ at the sampling time n.

In order to calculate $A_{\lambda i}(n)$ and $\delta_{\lambda i}(n)$ using the relationships described above, additional conditions must be met. For example, the sampling must take place equidistantly in time and simultaneously on all signals. Furthermore, the sampling frequency $f_A$ and modulation frequency $f_{PM}$ must be phase-locked to one another, which can be ensured, for example, by deriving both frequencies from a common reference frequency.

By suitable averaging procedures of a plurality of complex amplitude values at different sampling times, the noise can also be reduced.

Subsequently, it is described how the unmodulated phase values $\Phi_{\lambda i}(n)$ (i=1, 2, 3) required for further processing in the differential phase calculating units 54.1 to 54.3 are derived from the modulated phase values $\Phi_{\lambda iPM}(n)$ (i=1, 2, 3).

The unmodulated phase values $\Phi_{\lambda i} f(n)$ (i=1, 2, 3) for each sampling time n, for example, can be obtained by the following relationship:

$$\Phi_{\lambda i}(n) = \Phi_{\lambda iPM}(n-2k) + \Phi_{\lambda iPM}(n+2k))/2.$$

Described in more detail below is the determination of the required coarse position signal $L_G$ from the amplitude values $A_{\lambda i}$ (i=1, 2, 3) or $A_{\lambda iPM}$ (i=1, 2, 3) supplied to the coarse position determining unit 56.

By solving the following equation:

$$A_{\lambda i} = 2A_{\lambda iPM} * \left| \sin\left(2\pi * f_{PM} * \frac{L}{c}\right) \right|,$$

for L, the following relationship results for the coarse position signal $L_G$:

$$L_G = \frac{c}{2\pi * f_{PM}} * a\sin\left(\frac{A_{\lambda i}}{2A_{\lambda iPM}}\right).$$

This relationship is used in the coarse position determining unit 56 to determine the coarse position signal $L_G$.

The position phase amplitude $A_{\lambda i}$ (i=1, 2, 3) of a single wavelength $\lambda_i$ (i=1, 2, 3) would be sufficient for determining the coarse position signal $L_G$. However, it is considered to be advantageous to evaluate the position phase amplitudes $A_{\lambda i}$ (i=1, 2, 3) of all three wavelengths $\lambda_i$ (i=1, 2, 3) and to form from them the arithmetic mean value with respect to the coarse positions obtained. In this manner, the noise of the coarse position signal $L_G$ can be reduced.

From the relationship describing the dependency of the position phase amplitudes $A_{\lambda i}$ (i=1, 2, 3) from the coarse position signal $L_G$, namely:

$$A_{\lambda i} = 2A_{\lambda iPM} * \left|\sin\left(2\pi * f_{PM} * \frac{L_G}{c}\right)\right|,$$

an unambiguous determination of the coarse position signal $L_G$ from the position phase amplitudes $A_{\lambda i}$ (i=1, 2, 3) is only possible in a range in which the argument of the sine is between 0 and $\pi/2$.

The following relationship therefore applies:

$$f_{PM} * \frac{L}{c} < \frac{\pi}{2}, \text{ i.e., } 0 \leq L < \frac{c}{4f_{PM}}.$$

However, it is also possible to determine the coarse position signal $L_G$ from the phase angle $\delta_{\lambda i}$. Based on the following relationship:

$$\delta_{\lambda i} = -2\pi * f_{PM} * \frac{L}{c} * \frac{\pi}{2},$$

for the measuring length or absolute position information L, the coarse position signal $L_G$ can be calculated from the relationship:

$$L_G = -\frac{c}{2\pi * f_{PM}} * \left(\frac{\pi}{2} + \delta_{\lambda i}\right).$$

A determination of the coarse position signal $L_G$ from the phase angle $\delta_{\lambda i}$ is only possible for values from $L_G > 0$ to $$L_G < \frac{c}{2f_{PM}},$$

since no phase determination is possible for very small position phase amplitudes $A_{\lambda i}$ (i=1, 2, 3). The most accurate phase determination is possible around the range $$L_G = \frac{c}{f_{PM}},$$

since the position phase amplitude $A_{\lambda i}$ (i=1, 2, 3) becomes maximum here.

Depending on the measuring length, the coarse position signal $L_G$ can be determined either from the position phase amplitude $A_{\lambda i}$ or the phase angle $\delta_{\lambda i}$.

The unambiguous measuring range for the coarse position signal $L_G$ can thus be extended to, e.g.:

$$0 \leq L_G < \frac{c}{2f_{PM}}.$$

For a determination of the coarse position signal $L_G$ from the previously mentioned relationship:

$$L_G = \frac{c}{2\pi * f_{PM}} * a\sin\left(\frac{A_{\lambda i}}{2A_{\lambda iPM}}\right),$$

exact knowledge of the light phase amplitudes $A_{\lambda iPM}$ (i=1, 2, 3) of the individual wavelengths impressed by the modulation unit 15 is necessary. In the exemplary embodiment illustrated in FIG. 1, these quantities are determined by continuous measurement by the light phase amplitude determining unit 80. This unit may also be integrated into the light source unit as an alternative to the representation illustrated in FIG. 1.

Figure 6:
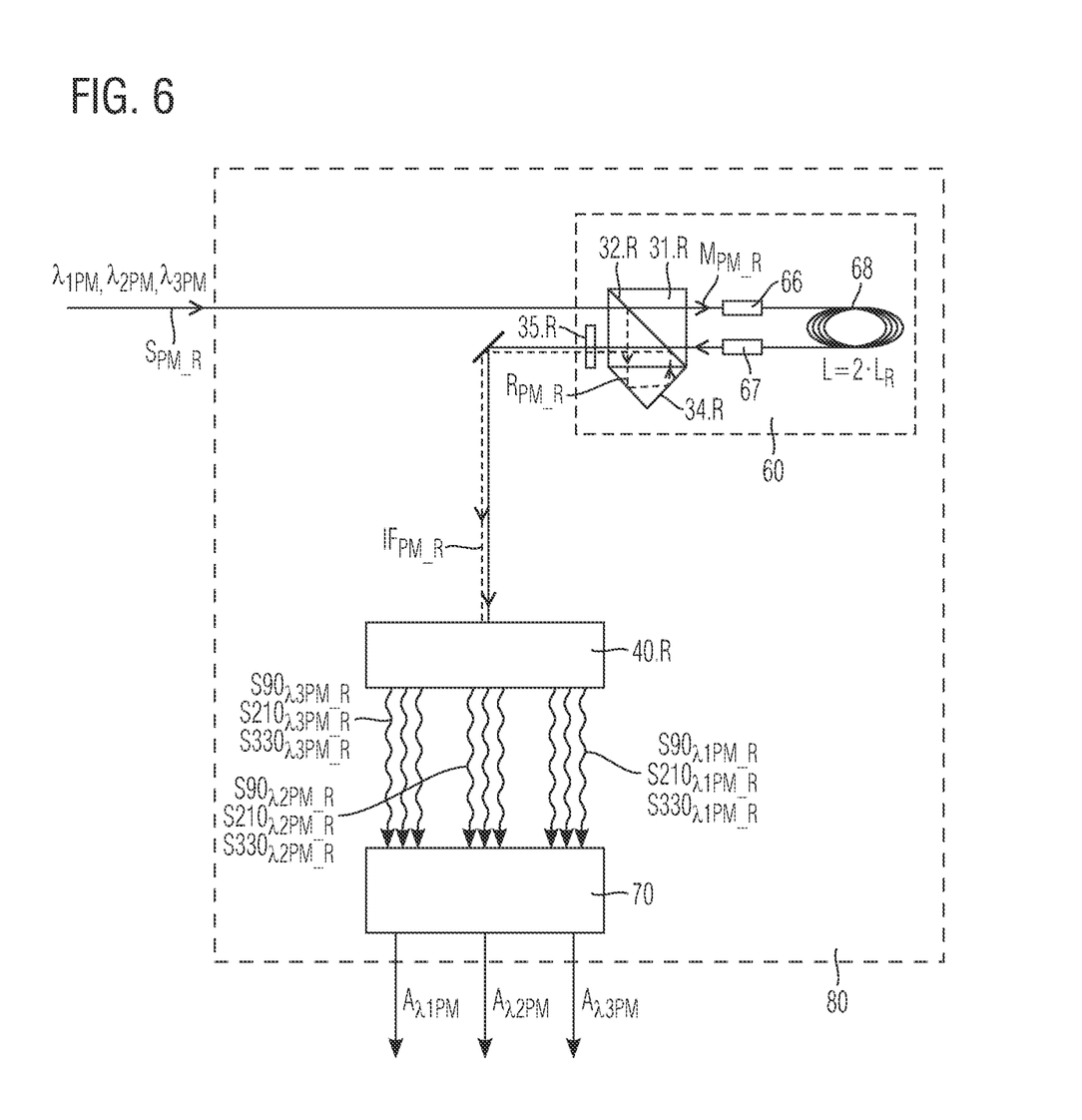
FIG. 6 illustrates a light phase amplitude determining unit of the device illustrated in FIG. 1.

The structure and operating principle of the light phase amplitude determining unit 80 used in this example embodiment is described with reference to FIG. 6.

Figure 7:
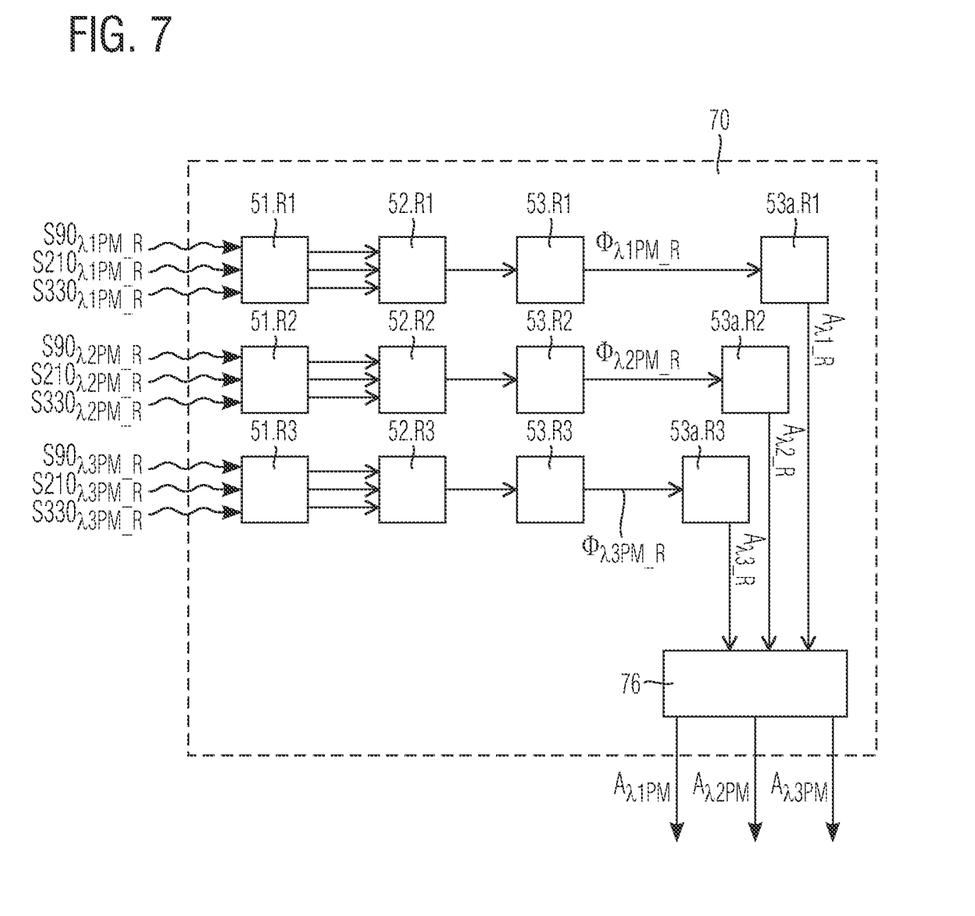
FIG. 7 illustrates a signal processing unit of the light phase amplitude determining unit illustrated in FIG. 6.
Figure 8:
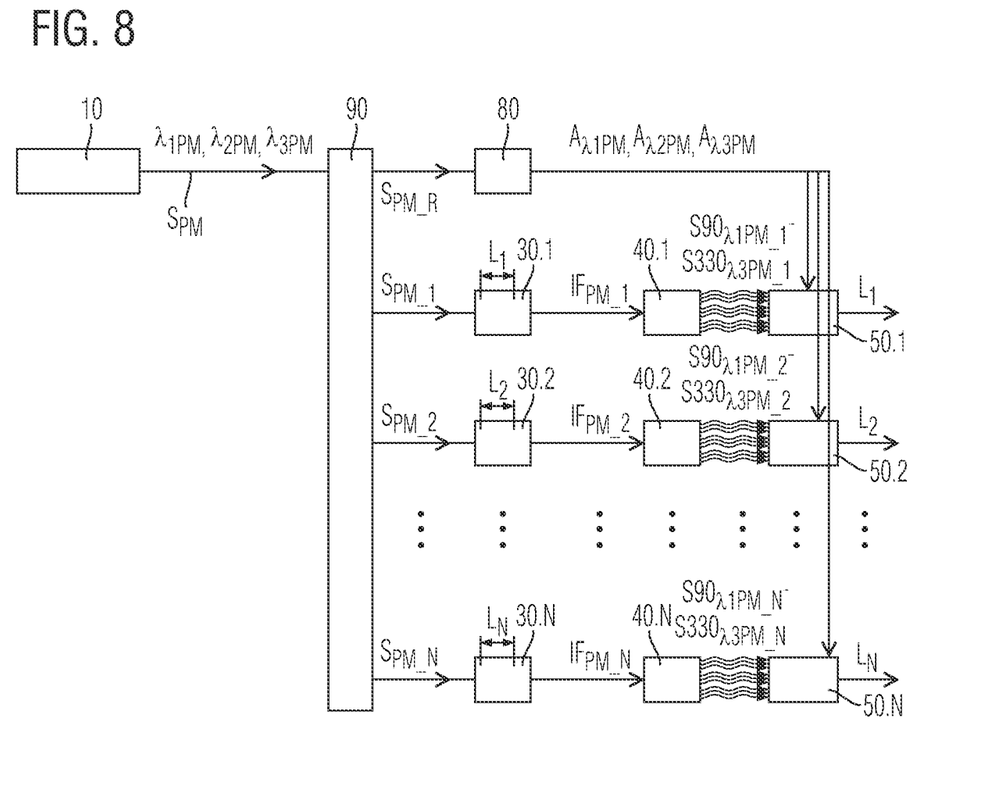
FIG. 8 illustrates a multi-axis measuring arrangement.

As mentioned above, part of the optical power is decoupled from the phase-modulated beam $S_{PM}$ via a beam splitter 100 and is supplied to the light phase amplitude determining unit 80 as beam $S_{PM\_R}$. As illustrated in FIG. 8, this includes a reference interferometer unit 60, a detection unit 40.R, and a signal processing unit 70. The functionality of the reference interferometer unit 60 corresponds in principle to the functionality of the interferometer unit 30 illustrated in FIG. 1. However, the measuring beam $M_{PM\_R}$ is coupled via a fiber coupler 66 into the reference fiber 68 with the optical path length $2\times L_R$ and is decoupled again using a fiber collimator 67. $L_R$ corresponds to the path length difference between the measuring beam and the reference beam in the reference interferometer unit 60. Alternatively, the sufficiently constant path length difference between the measuring beam $M_{PM\_R}$ and the reference beam $R_{PM\_R}$ required for the reference interferometer unit 60 can also be set in another manner. The detection unit 40.R and the signal processing unit 70, via which the position phase amplitudes $A_{\lambda i\_R}$ (i=1, 2, 3) of the individual wavelengths are determined, are downstream of the reference interferometer unit 60. This is done in analogous manner to the determination of the position phase amplitude $A_{\lambda i}$=1, 2, 3) in the signal processing unit 50. The structure of the signal processing unit 70 used for this purpose is illustrated in FIG. 7. The signal processing substantially corresponds to the process described above in connection with the signal processing unit 50 with reference to FIG. 3.

The light phase amplitudes $A_{\lambda iPM}$ (i=1, 2, 3) of the individual wavelengths $\lambda_i$ (i=1, 2, 3) impressed by the modulation unit 15 are determined in the signal processing unit 70 by based on the relationship:

$$A_{\lambda iR} = 2A_{\lambda iPM} * \left|\sin\left(2\pi * f_{PM} * \frac{L_G}{c}\right)\right|,$$

for $A_{\lambda iPM}$.

Subsequently, the light phase amplitudes $A_{\lambda iPM}$ (=1, 2, 3) impressed by the modulation unit 15 can be calculated from the relationship:

$$A_{\lambda iPM} = \frac{A_{\lambda i\_R}}{2\sin\left(2\pi * f_{PM} * \frac{L_R}{c}\right)},$$

and can be provided at the output of the light phase amplitude determining unit 80 for further processing.

In order to minimize the interpolation error due to component and alignment tolerances in the reference interferometer unit 60, a signal adjustment may be performed. In doing so, the path length difference $L_R$ in the reference interferometer unit 60 must be varied by at least half a wavelength. This can be done, for example, by varying a force applied on the reference fiber 68 or by varying the temperature of the reference fiber 68.

The device described herein may be used, for example, in a measuring arrangement for absolute length measurement, which includes a plurality of laser trackers. With such a measuring arrangement, the absolute position or absolute pose of an object in space can be determined using, for example, conventional multilateration methods. A corresponding measuring arrangement is schematically illustrated in FIG. 8. The phase-modulated beam $S_{PM}$ generated by the light source unit 10 first reaches a splitting element 90 in the form of a fiber splitter. This results in a splitting into a plurality of phase-modulated partial beams $S_{PM\_R}$ and $S_{PM\_j}$ (j=1, 2, ... N). A partial beam $S_{PM\_R}$ is supplied to a light phase amplitude determining unit 80, while the remaining partial beams $S_{PM\_j}$ (j=1, 2, ... N) are supplied to a plurality of N interferometer units 30.1 ... 30.N, each of which is assigned to different measuring axes or laser trackers. Each interferometer unit 30.1 ... 30.N is followed by a detection unit 40.1 ... 40N and a signal processing unit 50.1 ... 50.N in analogous manner to the exemplary embodiment described above, in order to determine absolute position information L1 ... LN with respect to the respective measuring reflector for each measuring axis.

It is also possible, instead of continuously determining the light phase amplitudes $A_{\lambda iPM}$ (i=1, 2, 3) using the light phase amplitude determining unit described above, to determine once the amplitudes $A_{\lambda iPM}$ (i=1, 2, 3) impressed via the phase modulation before the measurement operation t using a suitable method and then to make these values available as constants to the signal processing unit for further processing. Such a determination may be made, for example, during production, and cyclic recalibrations may be performed later.

A determination of the amplitudes $A_{\lambda iPM}$ (i=1, 2, 3) impressed via the phase modulation is also possible during measurement operation. To achieve this, at least two different lengths or absolute positions L_1 and L_2 must be set. During the movement between the two absolute positions L_1 and L_2, no beam interruption must occur in the interferometer, so that the measurement of the unmodulated phase value CA remains undisturbed. The associated unmodulated phase values $\Phi_{\lambda i\_1}$ (i=1, 2, 3) and $\Phi_{\lambda i\_2}$ (i=1, 2, 3) as well as the position phase amplitudes $A_{\lambda i\_1}$ (i=1, 2, 3) and $A_{\lambda i\_2}$ (i=1, 2, 3) are measured and stored. The following system of may be utilized:

$$L\_1 = \frac{c}{2\pi * f_{PM}} * a\sin\left(\frac{A_{\lambda i}-1}{2A_{\lambda iPM}}\right),$$

$$L\_2 = \frac{c}{2\pi * f_{PM}} * a\sin\left(\frac{A_{\lambda i}\_2}{2A_{\lambda iPM}}\right).$$

It is also possible to utilize the following relationships:

$$L\_1 = L\_0 + \Phi_{\lambda i\_1} * \frac{\lambda i}{2},$$

$$L\_2 = L\_0 + \Phi_{\lambda i\_2} * \frac{\lambda i}{2},$$

in which L_0 represents an unknown difference between incremental and absolute position information.

This then results in the following system of relationships:

$$L\_0 + \Phi_{\lambda i\_1} * \frac{\lambda i}{2} = \frac{c}{2\pi * f_{PM}} * a\sin\left(\frac{A_{\lambda i\_1}}{2A_{\lambda iPM}}\right),$$

$$L\_0 + \Phi_{\lambda i\_2} * \frac{\lambda i}{2} = \frac{c}{2\pi * f_{PM}} * a\sin\left(\frac{A_{\lambda i\_2}}{2A_{\lambda iPM}}\right).$$

This system of equations contains only the two unknowns L_0 and $A_{\lambda iPM}$, which may be solved for using a suitable procedure. This procedure can be applied repeatedly during measurement operation and may therefore also be used to compensate for slow changes in the light phase amplitudes $A_{\lambda iPM}$ (i=1, 2, 3).

What is claimed is:

1. A device for interferometric distance measurement, comprising:
    a multi-wavelength light source adapted to emit a beam having at least three different wavelengths;
    an interferometer unit adapted to split the beam into a measuring beam that propagates inside a measuring arm in a direction of a measuring reflector movable along a measuring axis and that is back reflected by the measuring reflector and a reference beam that propagates inside a reference arm in a direction of a stationary reference reflector and that is back reflected by the stationary reference reflector and to interferingly superimpose the back-reflected measuring and reference beams in an interference beam;
    a detection unit adapted to split the interference beam to produce a plurality of phase-shifted partial interference signals for each wavelength;
    a signal processing unit adapted to determine absolute position information relating to the measuring reflector from the partial interference signals for different wavelengths and an additional coarse position signal; and
    a modulation unit adapted to impress a phase modulation on at least one wavelength in the emitted beam of the multi-wavelength light source, resulting in a phase-modulated beam propagating toward the interferometer unit and causing a distance-dependent modulation in at least one partial interference signal, for generating the coarse position signal.

2. The device according to claim 1, wherein the modulation unit includes an electro-optical modulator and a sine wave generator, the sine wave generator adapted to drive the electro-optical modulator at a defined modulation frequency and a defined voltage amplitude.

3. The device according to claim 2, wherein the modulation frequency of the sine wave generator is greater than occurring mechanical and acoustic frequencies.

4. The device according to claim 2, wherein the modulation frequency of the sine wave generator is in a frequency range between 100 kHz and 10 MHz.

5. The device according to claim 2, wherein the electro-optical modulator is arranged as an integrated, fiber-coupled modulator.

6. The device according to claim 2, wherein a distance-dependent phase and amplitude modulation results in at least one partial interference signal.

7. The device according to claim 1, wherein the signal processing unit is adapted to generate the coarse position signal.

8. The device according to claim 7, wherein the signal processing unit is adapted to determine a modulated phase value from at least one evaluated partial interference signal, to determine a position phase amplitude from the modulated phase value, and to determine the coarse position signal based on the position phase amplitude and a light phase amplitude impressed on the phase-modulated beam.

9. The device according to claim 8, wherein the coarse position signal is determined according to the relationship:

$$L_G = \frac{c}{2\pi * f_{PM}} * a\sin\left(\frac{A_{\lambda i}}{2A_{\lambda i PM}}\right),$$

in which $L_G$ represents the coarse position signal, c represents the speed of light in a measuring medium, $f_{PM}$ represents a modulation frequency, $A_{\lambda i}$ represents the position phase amplitude for the three wavelengths (i=1, 2, 3), and $A_{\lambda i PM}$ represents the light phase amplitude for the three wavelengths (i=1, 2, 3).

10. The device according to claim 8, wherein a light phase amplitude determination unit is adapted to determine the light phase amplitude impressed on the phase-modulated beam.

11. The device according to claim 7, wherein the signal processing unit is adapted to determine an unmodulated phase value per wavelength from the phase-shifted partial interference signals, to form a plurality of differential phases from the unmodulated phase values, each differential phase associated with different synthetic wavelengths, and to determine from the coarse position signal and the differential phases a high-resolution absolute position information relating to the measuring reflector.

12. The device according to claim 8, wherein the signal processing unit is adapted to determine an unmodulated phase value per wavelength from the phase-shifted partial interference signals, to form a plurality of differential phases from the unmodulated phase values, each differential phase associated with different synthetic wavelengths, and to determine from the coarse position signal and the differential phases a high-resolution absolute position information relating to the measuring reflector.

13. The device according to claim 1, further comprising:
a splitting element adapted to split the phase-modulated beam into a plurality of phase-modulated partial beams; and
a plurality of interferometer units, each interferometer unit being assigned to a respective measuring axis and adapted to be supplied with a respective phase-modulated partial beam;
wherein each interferometer unit is followed by respective detection and signal processing units, to determine for each measuring axis absolute position information with regard to the respective measuring reflector.

14. The device according to claim 10, further comprising:
a splitting element adapted to split the phase-modulated beam into a plurality of phase-modulated partial beams; and
a plurality of interferometer units, each interferometer unit being assigned to a respective measuring axis and adapted to be supplied with a respective phase-modulated partial beam;
wherein each interferometer unit is followed by respective detection and signal processing units, to determine for each measuring axis absolute position information with regard to the respective measuring reflector; and
wherein the light phase amplitude determination unit is adapted to be supplied with at least one of the phase-modulated partial beams and to supply the determined light phase amplitude to the signal processing units in individual measurement axes for further processing.

15. The device according to claim 1, wherein the interferometer unit includes a beam splitting unit, the measuring reflector being movable along at least one measuring direction, the stationary reference reflector, and a beam recombining unit, the beam splitting unit adapted to split the phase-modulated beam into the measuring beam and the reference beam, the beam recombining unit adapted to superpose the measuring and reference beams back-reflected by the measuring and reference reflectors to form the interference beam.

* * * * *